United States Patent
Takaoki

(10) Patent No.: US 10,727,930 B2
(45) Date of Patent: Jul. 28, 2020

(54) RADIO REPEATER SELECTION APPARATUS AND MACHINE LEARNING DEVICE

(71) Applicant: FANUC CORPORATION, Yamanashi (JP)

(72) Inventor: Hidesato Takaoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/048,674

(22) Filed: Jul. 30, 2018

(65) Prior Publication Data

US 2019/0036594 A1    Jan. 31, 2019

(30) Foreign Application Priority Data

Jul. 31, 2017 (JP) ................................. 2017-148265

(51) Int. Cl.
*H04B 7/14* (2006.01)
*H04B 7/155* (2006.01)
*G06N 20/00* (2019.01)

(52) U.S. Cl.
CPC ............... *H04B 7/14* (2013.01); *G06N 20/00* (2019.01); *H04B 7/155* (2013.01)

(58) Field of Classification Search
USPC ......................................................... 370/315
See application file for complete search history.

(56) References Cited

U.S. PATENT DOCUMENTS

| 2006/0080707 A1* | 4/2006 | Laksono ............. H04L 12/2805 725/38 |
| 2010/0222925 A1* | 9/2010 | Anezaki ............... G05D 1/0221 700/253 |
| 2013/0031036 A1 | 1/2013 | Kojima |

(Continued)

FOREIGN PATENT DOCUMENTS

| JP | 2007-233817 A | 9/2007 |
| JP | 2008-278148 A | 11/2008 |

(Continued)

OTHER PUBLICATIONS

Office Action in JP Application No. 2017-148265, dated Sep. 10, 2019, 3pp.

*Primary Examiner* — Gregory B Sefcheck
*Assistant Examiner* — Majid Esmaeilian
(74) *Attorney, Agent, or Firm* — Hauptman Ham, LLP

(57) ABSTRACT

A machine learning device included in a radio repeater selection apparatus has: a state monitoring unit that monitors, as state variables representing multiplexed communication path data specifying a construction state of a multiplexed communication paths and multiplexed radio communication state data specifying a state of multiplexed radio communication among devices to be managed; a determination data acquisition unit that acquires determination data designating a result of determination on whether or not the construction state of the multiplexed communication paths is appropriate; and a learning unit that learns the construction state of the multiplexed communication paths and the multiplexed radio communication state data in association with each other on the basis of the state variables and the determination data.

8 Claims, 6 Drawing Sheets

(56) References Cited

U.S. PATENT DOCUMENTS

2015/0301338 A1* 10/2015 Van Heugten ........... G02C 7/04
  345/8
2015/0316820 A1* 11/2015 Duston ................. G02B 30/00
  349/138
2015/0319077 A1   11/2015 Vasseur et al.
2016/0285757 A1*  9/2016 Srivastava ............. H04L 12/10

FOREIGN PATENT DOCUMENTS

| JP | 2011-652 A | 1/2011 |
| JP | 2013-26980 A | 2/2013 |
| JP | 2015-91041 A | 5/2015 |
| JP | 2015-201728 A | 11/2015 |
| WO | 2016072838 A1 | 5/2016 |

* cited by examiner

RADIO REPEATER SELECTION APPARATUS AND MACHINE LEARNING DEVICE

RELATED APPLICATIONS

The present application claims priority to Japanese Application Number 2017-148265, filed on Jul. 31, 2017, the disclosure of which is hereby incorporated by reference herein in its entirety.

BACKGROUND OF THE INVENTION

1. Field of the Invention

The present invention relates to a radio repeater selection apparatus and a machine learning device.

2. Description of the Related Art

When a machine such as a robot or a numerically controlled machine tool is instructed or operated, a radio operation panel capable of radio communication with the control device of the machine may be used. For example, each of Japanese Patent Application Publications Nos. 2007-233817 and 2011-000652 discloses a system in which an instruction/operation panel and a control device perform radio communication therebetween to allow a machine such as a robot to be controlled in accordance with an instruction from the instruction/operation panel.

Safety standards for robots prescribes that, in the case of using a radio instruction/operation panel for the instruction/operation of a robot or the like, when a safety signal is discontinued, the robot should make a protection stop. Consequently, in a situation in which a large number of radio devices (including not only another radio instruction/operation panel, but also a mobile phone carried by a worker, an external radio device, and the like) are used at a workplace and radio lines are busy, it is highly possible that radio communication is discontinued. As a result, the operation of a robot is frequently halted, and a comfortable instructing operation cannot be performed. In an environment in which a large number of radio devices are present, it is also possible to take countermeasures by performing the changing of a radio channel or the like using the technique disclosed in, e.g., Japanese Patent Application Publication No. 2015-201728 or the like. However, even when such a technique is used, it is difficult to completely prevent radio communication from being discontinued under the influence of the distance and positional relationship between an instruction/operation panel and a control device which controls an object to be operated or the location and operation of another machine.

As a method for solving such a problem, it can be considered to, e.g., use a plurality of routes to transmit radio signals to control devices, as shown in FIG. 7. Thus, redundant data transmission from each of radio repeaters (such as, e.g., transmission of the same data using a plurality of radio communication paths) is performed to reduce the possibility of discontinuation of radio communication. In the example shown in FIG. 7, not only the radio communication paths used for direct radio communication from the radio instruction/operation panel to the control devices which control the robots to be instructed, but also the radio communication paths connected via the radio repeater interposed therebetween are illustrated. In addition to the radio repeater, the radio modules embedded in the control devices which control the robots to be instructed are also regarded as radio repeaters and, through such radio repeaters, the plurality of radio communication paths are connected to form a multiplexed communication path. By performing multiplexed radio communication via the multiplexed communication path, even when any of the radio communication paths is interrupted by an object placed in a factory due to, e.g., the movement of an instructing worker, it is possible to prevent discontinuation of communication between the radio instruction/operation panel and the control device.

When such a technique is used, for each radio instruction/operation panel, it is determined which and how many radio communication paths are to be allocated thereto and, using the allocated radio communication paths, a multiplexed communication path is formed. During multiplexed radio communication using the multiplexed communication path, the state of transmission of a radio wave between individual radio devices is monitored and, when communication can no longer be performed or the radio wave is weakened, a change to another radio communication path (such as the changing of the radio repeater in use or a channel change) is performed. Since a plurality of radio instruction/operation panels are present at a workplace, to allow each of devices which perform multiplexed radio communication to comfortably communicate, it is necessary to form a multiplexed communication path or dynamically change the radio communication path.

However, since radio signals undergo reflection/diffraction/fading (mutual weakening) and an environment is changing in real time under the influence of a signal from another radio device and the like, it is necessary to perform appropriate allocation of radio communication paths (allocation of a radio repeater used for multiplexed radio communication, a subordinate control device, and a channel) in real time, while timely recognizing the state of the environment, which results in a difficult task.

SUMMARY OF THE INVENTION

It is therefore an object of the present invention to provide a radio repeater selection apparatus and a machine learning device which allow, in an environment in which a plurality of radio devices are present in mixed relation, radio communication paths used for multiplexed radio communication to be allocated so as to allow each of the radio devices to comfortably communicate. The radio repeater selection apparatus of the present invention solves the problem described above by selecting a plurality of radio repeaters (radio devices each having the function of repeating a radio wave) used for multiplexed radio communication performed by each of devices to be managed and causing the machine learning device to perform machine learning of the construction (or changing) of a multiplexed communication path by reinforcement learning.

An embodiment of the present invention is a radio repeater selection apparatus constructing or changing multiplexed communication paths used for communication between devices to be managed, the radio repeater selection apparatus including: a machine learning device that learns how the multiplexed communication paths are allocated, wherein the machine learning device includes: a state monitoring unit that monitors, as state variables representing multiplexed communication path data specifying the construction state of the multiplexed communication paths and multiplexed radio communication state data specifying a state of multiplexed radio communication among the devices to be managed; a determination data acquisition unit that acquires determination data designating a result of determination on whether or not the construction state of the multiplexed communication paths is appropriate; and a learning unit that learns the construction state of the multiplexed communication paths and the multiplexed radio communication state data in association with each other on the basis of the state variables and the determination data.

Another embodiment of the present invention is a machine learning device learning a construction state of multiplexed communication paths used for communication between devices to be managed, the machine learning device including: a state monitoring unit that monitors, as state variables multiplexed communication path data specifying the construction state of the multiplexed communication paths and multiplexed radio communication state data specifying a state of multiplexed radio communication among devices to be managed; a determination data acquisition unit that acquires determination data designating a result of determination on whether or not the construction state of the multiplexed communication paths is appropriate; and a learning unit that learns the construction state of the multiplexed communication paths and the multiplexed radio communication state data in association with each other on the basis of the state variables and the determination data.

The present invention allows for appropriate selection of the radio repeater to be used by each of a plurality of radio devices. Consequently, the signal transmitted from a radio instruction/operation panel to the radio repeater selection apparatus of a robot is no longer discontinued to allow a worker to perform a comfortable instructing operation.

BRIEF DESCRIPTION OF THE DRAWINGS

The above and other objects and features of the present invention will be made more apparent by the following description of the embodiments thereof with reference to the accompanying drawings wherein.

DETAILED DESCRIPTION OF THE PREFERRED EMBODIMENTS

The following will describe the embodiments of the present invention with reference to the drawings.

Figure 1:
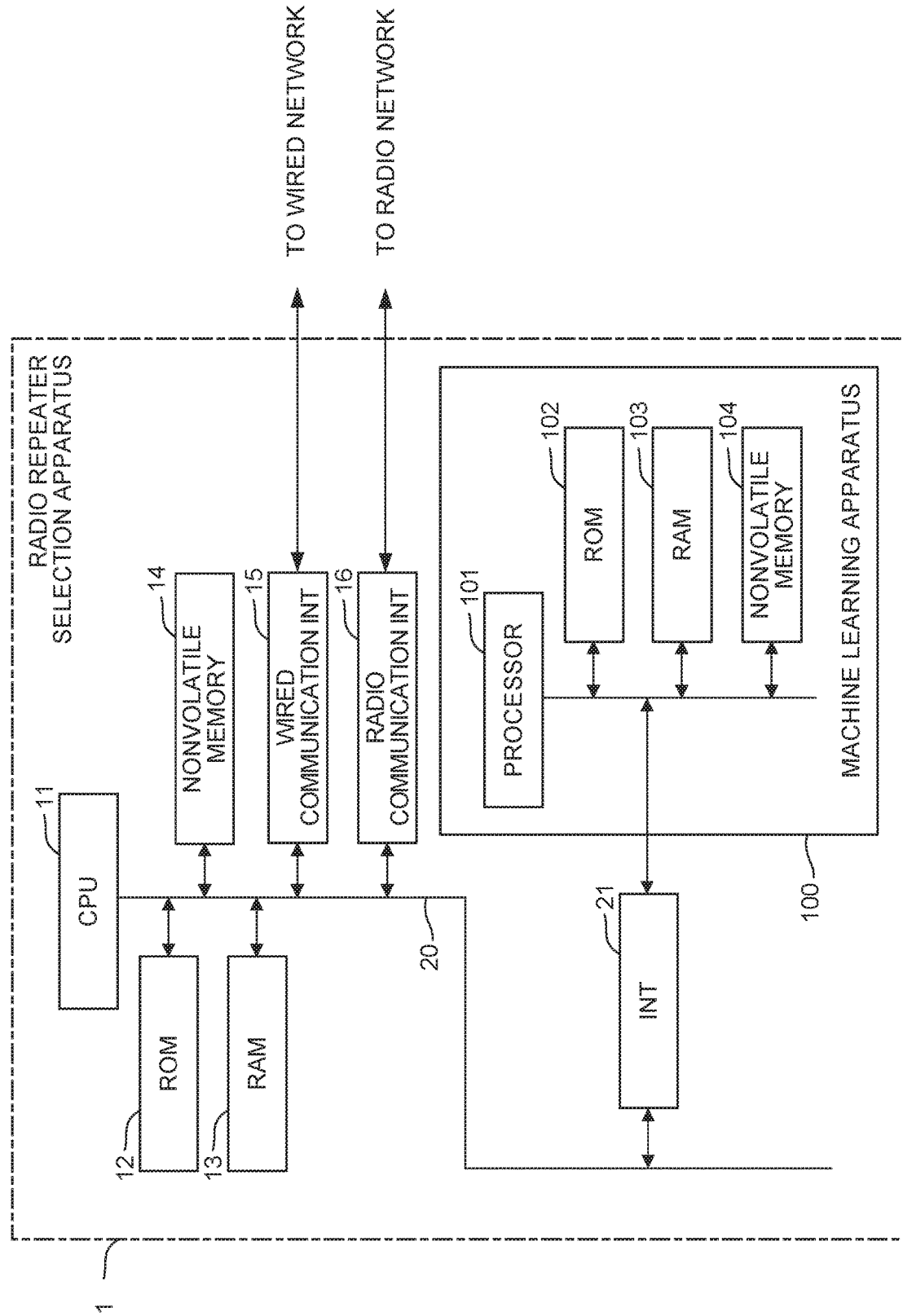
FIG. 1 is a schematic hardware configuration diagram of a radio repeater selection apparatus according to the first embodiment.

FIG. 1 is a schematic hardware configuration diagram showing a radio repeater selection apparatus according to the first embodiment and the main portion of a machine tool controlled by the radio repeater selection apparatus. A radio repeater selection apparatus 1 can be implemented as a higher-level apparatus (such as a host computer or cell controller) which manages devices to be managed such as, e.g., control devices (not shown) which control a plurality of robots (not shown) placed at a workplace such as, e.g., a factory, numerically controlled machine tools (not shown), radio repeaters, and radio instruction/operation panels. A CPU 11 included in the radio repeater selection apparatus 1 according to the present embodiment is a processor which totally controls the radio repeater selection apparatus 1. The CPU 11 reads the system program stored in a ROM 12 via a bus 20 and controls the entire radio repeater selection apparatus 1 in accordance with the system program. A RAM 13 temporarily stores temporary calculation data and display data.

A nonvolatile memory 14 is configured as a memory which holds a stored state through, e.g., a backup process using a battery not shown even when the power source of the radio repeater selection apparatus 1 is turned OFF. The nonvolatile memory 14 stores not only the data input via an input device such as a keyboard not shown and the operation program input via an interface not shown, but also management data (information such as the types and usable protocols of the devices to be managed, the communication addresses of the devices to be managed, and the current locations where the devices to be managed are placed) related to the devices to be managed. The program and various data stored in the nonvolatile memory 14 may also be expanded to the RAM 13 upon execution/use thereof.

In the ROM 12, various system programs (including a system program for controlling communication with a machine learning device 100 described later) for executing instructions given to the devices to be managed.

The radio repeater selection apparatus 1 is designed to be able to transmit and receive instructions and data to and from the devices to be managed by wired/radio communication via a wired communication interface 15 or a radio communication interface 16. Such communication interfaces may use any communication protocol as long as instructions and data can be transmitted and received to and from the devices to be managed.

An interface 21 is intended to connect the radio repeater selection apparatus 1 and the machine learning device 100. The machine learning device 100 includes a processor 101 which controls the entire machine learning device 100, a ROM 102 which stores system programs and the like, a RAM 103 for performing temporary storage in each of processes related to machine learning, and a nonvolatile memory 104 used to store learning models and the like. The machine learning device 100 can monitor various information (such as the states of connection of the devices to be managed and the current locations thereof) which can be acquired by the radio repeater selection apparatus 1 via the interface 21. The radio repeater selection apparatus 1 also receives an instruction to perform a connection set-up for multiplexed radio communication, which is output from the machine learning device 100, and gives instructions to construct or change a multiplexed communication path to the devices to be managed via the wired communication interface 15 or the radio communication interface 16.

Figure 2:
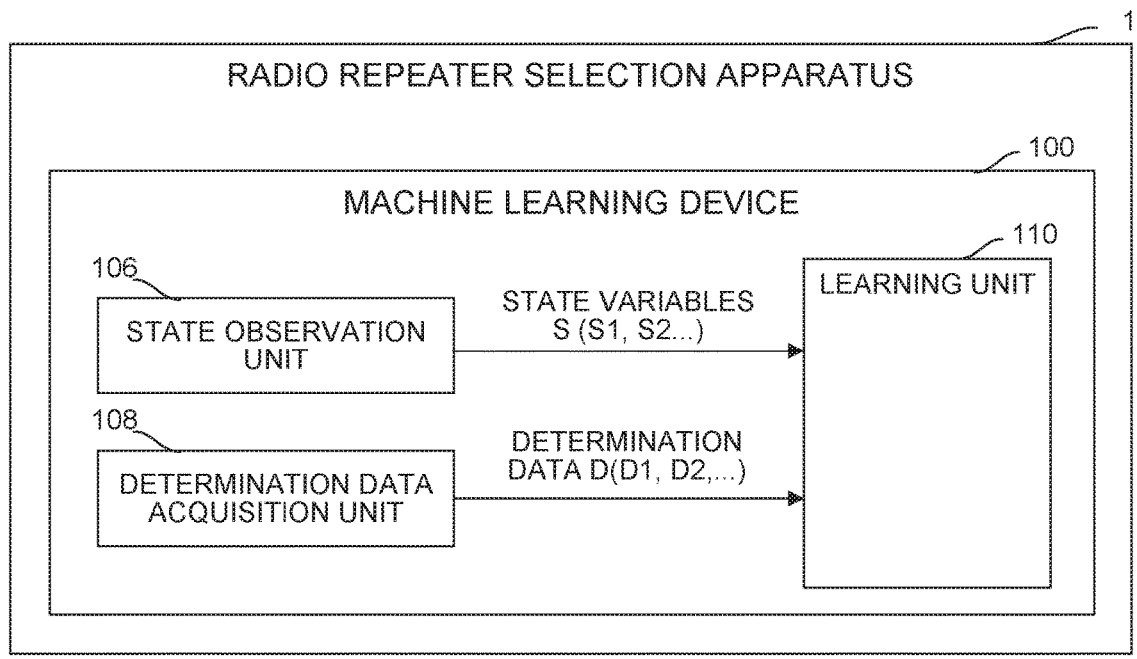
FIG. 2 is a schematic functional block diagram of the radio repeater selection apparatus according to the first embodiment.

FIG. 2 is a schematic functional block diagram of the radio repeater selection apparatus 1 and the machine learning device 100 according to the first embodiment. The machine learning device 100 includes software (such as a learning algorithm) and hardware (such as the processor 101) which allow the machine learning device 100 to learn the construction or changing of the multiplexed communication path relative to the state of multiplexed radio communication among devices to be managed through a so-called machine learning process. What is to be learned by the machine learning device 100 included in the radio repeater selection apparatus 1 is equivalent to a model structure representing the correlation between the state of multiplexed radio communication among devices to be managed and the construction or changing of the multiplexed communication path.

As shown in the function block in FIG. 2, the machine learning device 100 included in the radio repeater selection apparatus 1 includes a state monitoring unit 106 which monitors multiplexed communication path data S1 showing the construction state of a multiplexed communication path and multiplexed radio communication state data S2 showing the state of multiplexed radio communication (quality of multiplexed radio communication) among devices to be managed as state variables S showing the current state of an environment, a determination data acquisition unit 108 which acquires determination data D including multiplexed communication path determination data D1 showing the result of determining whether or not the construction state of the multiplexed communication path is appropriate, and a learning unit 110 which performs learning using the state variables S and the determination data D by associating the multiplexed communication path data S1 with the state of multiplexed radio communication among devices to be managed.

The state monitoring unit 106 can be configured as, e.g., a function of the processor 101. Alternatively, the state monitoring unit 106 can be configured as, e.g., software stored in the ROM 102 to cause the processor 101 to function. The multiplexed communication path data S1, which is among the state variables S monitored by the state monitoring unit 106, can be acquired as the allocation of radio communication paths to individual radio instruction/ operation panels (allocation of radio repeaters, the radio modules of control devices, and a radio communication channel which are used for multiplexed radio communication to the individual radio instruction/operation panels).

In an early stage of learning, as the multiplexed communication path data S1, the construction state of the multiplexed communication path which is, e.g., declared by a worker skilled in constructing multiplexed radio communication and given to the radio repeater selection apparatus 1 can be used. In a rather advanced stage of learning, as the multiplexed communication path data S1, the construction state of the multiplexed communication path which is determined in an immediately previous learning cycle by the machine learning device 100 on the basis of a learning result from the learning unit 110 can be used. In such a case, it may also be possible that the machine learning device 100 temporarily stores the determined construction state of the multiplexed communication path in the RAM 103 on a per-learning-cycle basis, and the state monitoring unit 106 acquires the construction state of the multiplexed communication path which is determined in the immediately previous learning cycle by the machine learning device 100 from the RAM 103.

As the multiplexed radio communication state data S2 which is among the state variables S, e.g., the radio field intensity of radio communication, a radio communication success rate (communication success rate determined in accordance with a communication protocol such as the ratio of the number of successful data transmission sessions to the total number of data transmission sessions or the ratio of the number of times that data has not reached only during a predetermined time period to the total number of data transmission sessions), or the like which is acquired by the radio repeater selection apparatus 1 from each of the devices to be managed can be used. The radio repeater selection apparatus 1 can request information related to the state of radio communication from each of the devices to be managed and obtain data such as the radio field intensity of radio communication or the radio communication success rate as a response thereto from the device to be managed. The state monitoring unit 106 may directly use the data such as the radio field intensity of radio communication or the radio communication success rate acquired from each of the devices to be managed as the multiplexed radio communication state data S2 or may also use a value representing the standardized state of radio communication (quality of radio communication) calculated from the data such as the radio field intensity of radio communication or the radio communication success rate from each of the devices to be managed using a predetermined expression as the multiplexed radio communication state data S2.

The determination data acquisition unit 108 can be configured as, e.g., a function of the processor 101. Alternatively, the determination data acquisition unit 108 can be configured as, e.g., software stored in the ROM 102 to cause the processor 101 to function. The determination data acquisition unit 108 can use, as the determination data D, the multiplexed communication path determination data D1 as a value showing the result of determining whether or not the construction state of the multiplexed communication path is appropriate. The determination data acquisition unit 108 can determine the determination data D on the basis of the radio field intensity of radio communication, the radio communication success rate, or the like obtained when the state monitoring unit 106 monitors the multiplexed radio communication state data S2 and acquired from each of the devices to be managed. The determination data D is an index showing the result of performing an instructing operation by multiplexed radio communication using each of the radio instruction/operation panels under the state variables S.

In terms of learning cycles performed by the learning unit 110, the state variables S simultaneously input to the learning unit 110 are based on data obtained one learning cycle before the determination data D is acquired. While the machine learning device 100 included in the radio repeater selection apparatus 1 pursues learning, in the environment, the acquisition of the multiplexed radio communication state data S2, the execution of the instructing operation using the radio instruction/operation panels through the multiplexed communication path constructed or changed on the basis of the multiplexed communication path data S1, and the acquisition of the determination data D are repeatedly performed.

The learning unit 110 can be configured as, e.g., a function of the processor 101. Alternatively, the learning unit 110 can be configured as, e.g., software stored in the ROM 102 to cause the processor 101 to function. The learning unit 110 learns the multiplexed communication path data S1 relative to the state of multiplexed radio communication among devices to be managed. The learning unit 110 can repeatedly perform learning based on data sets including the state variables S and the determination data D which are described above. While a learning cycle for the multiplexed communication path data S1 relative to the state of multiplexed radio communication among devices to be managed is repeated, the multiplexed radio communication state data S2 among the state variables S is acquired from the state of multiplexed radio communication acquired one learning cycle before as described above, the multiplexed communication path data S1 among the state variables S is assumed to show the construction state of the multiplexed communication path obtained on the basis of the previous learning results, and the determination data D is assumed to show the result of determining whether or not the current state of multiplexed radio communication among devices to be managed is appropriate in the present learning cycle in the state where the multiplexed radio communication path has been constructed or changed on the basis of the multiplexed communication path data S1.

By repeating such a learning cycle, the learning unit 110 can automatically recognize a feature indicating the correlation between the state of multiplexed radio communication among devices to be managed (multiplexed radio communication state data S2) and the construction state of the multiplexed communication path relative to the state. At the time when a learning algorithm is started, the correlation between the multiplexed radio communication state data S2 and the construction state of the multiplexed communication path is substantially unknown. However, in the pursuit of learning, the learning unit 110 gradually recognizes the feature and interprets the correlation. When the interpretation of the correlation between the multiplexed radio communication state data S2 and the construction state of the multiplexed communication path advances to a rather reliable level, the learning result repetitively output from the learning unit 110 can be used to make an action choice (make a decision) about what to do with the construction state of the multiplexed communication path (how to construct or change the multiplexed communication path) relative to the current state (i.e., the current state of multiplexed radio communication among devices to be managed). In other words, the learning unit 110 allows the correlation between the current state of multiplexed radio communication among devices to be managed and the action of deciding what to do with the construction state of the multiplexed communication path (how to construct or change the multiplexed communication path) relative to the state to gradually approach an optimal solution.

As described above, in the machine learning device 100 included in the radio repeater selection apparatus 1, the learning unit 110 learns the construction state of the multiplexed communication path (construction or changing of the multiplexed communication path) in accordance with the machine learning algorithm using the state variables S monitored by the state monitoring unit 106 and the determination data D acquired by the determination data acquisition unit 108. The state variables S include data sets insusceptible to the influence of disturbance, such as the multiplexed communication path data S1 and the multiplexed radio communication state data S2. The determination data D is uniquely determined by acquiring the current state of multiplexed radio communication among devices to be managed via the radio repeater selection apparatus 1. Therefore, with the machine learning device 100 included in the radio repeater selection apparatus 1, by using a learning result from the learning unit 110, it is possible to automatically and precisely determine the construction state of the multiplexed communication path in accordance with the state of multiplexed radio communication among the devices to be managed without dependence on an arithmetic operation or estimation.

When the construction state of the multiplexed communication path can automatically be determined without dependence on an arithmetic operation or estimation, by merely recognizing the current state of multiplexed radio communication among devices to be managed (multiplexed radio communication state data S2), an appropriate value representing the construction state of the multiplexed communication path can promptly be determined. Consequently, it is possible to efficiently construct or change the multiplexed communication path in accordance with the state.

In a modification of the machine learning device 100 included in the radio repeater selection apparatus 1, the state monitoring unit 106 can use, as the state variables S, location information data S3 showing the location of each of the devices to be managed. Among the locations of the devices to be managed, the locations of fixedly placed devices to be managed (such as the control devices of robots, numerically controlled machine tools, and radio repeaters) may also be set in advance as management data related to the devices to be managed which is stored in the nonvolatile memory 14 of the radio repeater selection apparatus 1. On the other hand, the locations of movable devices to be managed (such as radio instruction/operation panels) may also be calculated on the basis of the result of detecting the intensities of radio waves in the devices to be managed using the radio module included in another device to be managed.

According to the modification described above, the machine learning device 100 is allowed to learn the construction state of the multiplexed communication path relative to both of the state of multiplexed radio communication among devices to be managed and the location of each of the devices to be managed. For example, when workers using radio instruction/operation panels are moving at a workplace, it is possible to give an instruction to construct or change an optimal multiplexed communication path by also taking the moving locations thereof into consideration.

In another modification of the machine learning device 100 included in the radio repeater selection apparatus 1, as the state variables S monitored by the state monitoring unit 106, communication delay data S4 showing the degree of time delay of communication data between a radio instruction/operation panel and the control device of a communication partner can be used.

According to the modification described above, the machine learning device 100 is allowed to learn the construction state of the multiplexed communication path relative to both of the state of multiplexed radio communication among devices to be managed and the degree of time delay of communication data between the radio instruction device and the control device of the communication partner.

In still another modification of the machine learning device 100 included in the radio repeater selection apparatus 1, as the determination data D acquired by the determination data acquisition unit 108, not only the multiplexed communication path determination data D1 as a value showing the result of determining whether or not the construction state of the multiplexed communication path is appropriate, but also communication delay determination data D2 showing the degree of time delay of communication data between a radio instruction/operation panel and the control device of a communication partner can be used.

In accordance with the modification described above, when learning the construction state of the multiplexed communication path relative to the state of multiplexed radio communication among devices to be managed, the machine learning device 100 can also consider the time delay of communication data between the radio instruction/operation panel and the control device of the communication partner.

Figure 3:
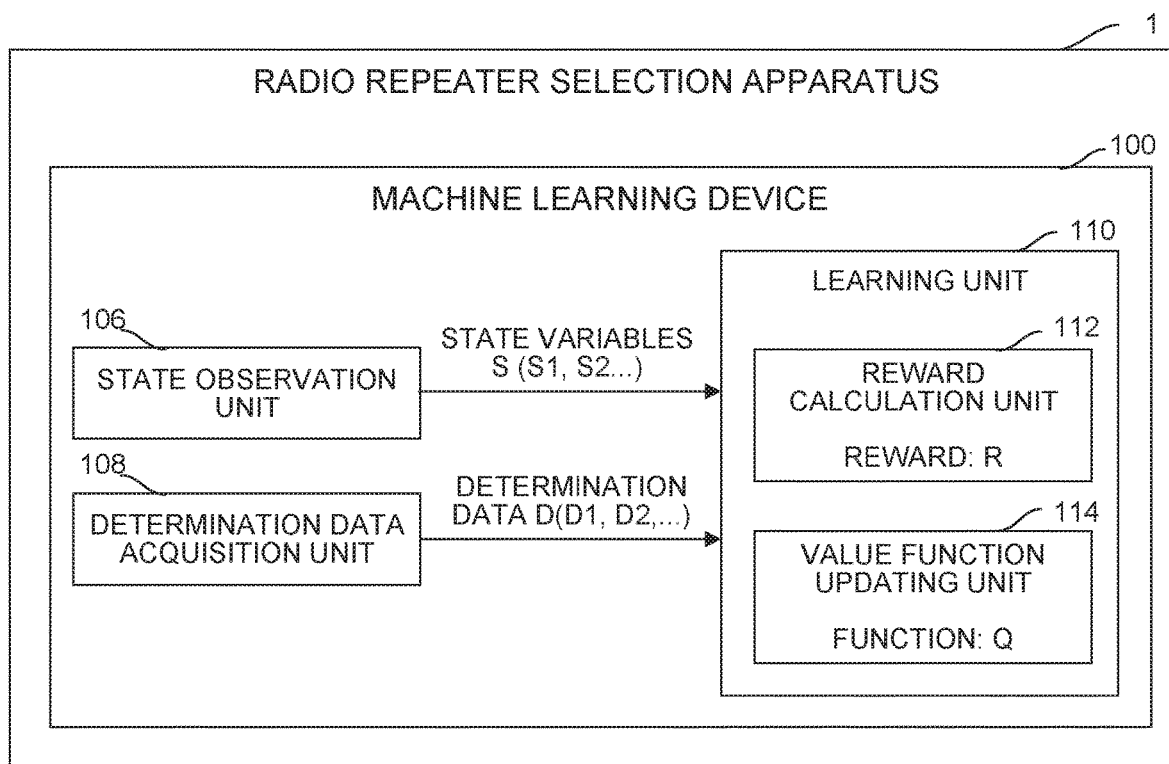
FIG. 3 is a schematic functional block diagram showing a form of the radio repeater selection apparatus.

In the machine learning device 100 having the configuration described above, the learning algorithm executed by the learning unit 110 is not particularly limited, and a known learning algorithm for machine learning can be used. FIG. 3 shows a form of the radio repeater selection apparatus 1 shown in FIG. 1, which is a configuration including the learning unit 110 that performs reinforcement learning as an example of the learning algorithm. The reinforcement learning is a method which repeats a cycle of monitoring the current state of the environment in which an object to be learned is present (i.e., an input), while taking a predetermined action in the current state (i.e., an output), and giving any reward to the taken action on a trial-and-error basis and learns such a policy (which is the determination of the construction state of the multiplexed communication path in the machine learning device in the present invention) as to maximize the total value of rewards as an optimal solution.

In the machine learning device 100 included in the radio repeater selection apparatus 1 shown in FIG. 3, the learning unit 110 includes a reward calculation unit 112 which determines a reward R related to the result (equivalent to the determination data D used in a learning cycle subsequent to the learning cycle in which the state variables S are acquired) of determining whether or not the construction state of the multiplexed communication path determined on the basis of the state variables S is appropriate and a value function updating unit 114 which updates, using the reward R, a function Q representing the value of the construction state of the multiplexed communication path. In the learning unit 110, the value function updating unit 114 repeats the update of the function Q to allow the learning unit 110 to learn the construction state of the multiplexed communication path relative to the state of multiplexed radio communication among devices to be managed.

An example of the reinforcement learning algorithm executed by the learning unit 110 will be described. The algorithm in this example is known as Q-learning. The Q-learning is a method which uses a state s of an agent and an action a which may be chosen by the agent in the state s as independent variables to learn a function Q (s, a) representing the value of the action when the action a is chosen in the state s. Choosing the action a which maximizes the value function Q in the state s leads to an optimal solution. The Q-learning is started in the state where the correlation between the state s and the action a is unknown. A trial-and-error process of choosing various actions a in an arbitrary state s is repetitively performed to repetitively update the value function Q and bring the value function Q closer to the optimal solution. By configuring the value function Q such that, when a change occurs in an environment (i.e., state s) as a result of choosing the action a in the state s, a reward (i.e., weighting of the action a) r in accordance with the change is obtained and leading learning such that the action a which allows the higher reward r to be obtained is chosen, it is possible to allow the value function Q to approach the optimal solution in a relatively short time.

An update expression for the value function Q can be generally represented as shown below in Expression 1. In Expression 1, $s_t$ and $a_t$ represent a state and an action at a time t. The action $a_t$ changes the state $s_t$ to a state $s_{t+1}$, while $r_{t+1}$ represents a reward obtained as a result of the change from the state $s_t$ to the state $s_{t+1}$. The term maxQ means Q when the action a which maximizes (is considered as such at the time t) the value Q at the time t+1. In Expression 1, α and γ represent a learning factor and a discount factor, which are arbitrarily set to satisfy $0<\alpha \leq 1$ and $0<\gamma \leq 1$.

$$Q(s_t, a_t) \leftarrow Q(s_t, a_t) + a\left(r_{t+1} + \gamma \max_a Q(s_{t+1}, a) - Q(s_t, a_t)\right) \quad \text{Expression 1}$$

When the learning unit 110 performs the Q-learning, the state variables S monitored by the state monitoring unit 106 and the determination data D acquired by the determination data acquisition unit 108 correspond to the state s in the update expression. The action of deciding what to do with the construction state of the multiplexed communication path (how to construct or change the multiplexed communication path) relative to the current state (i.e., the current state of multiplexed radio communication among devices to be managed) corresponds to the action a in the update expression. The reward R determined by the reward calculation unit 112 corresponds to the reward r in the update expression. Accordingly, the value function updating unit 114 repetitively updates the function Q representing the value of the construction state of the multiplexed communication path relative to the current state by the Q-learning using the reward R.

The reward R determined by the reward calculation unit 112 can be regarded as the positive reward R in a case where, e.g., after the construction state of the multiplexed communication path is determined, the multiplexed communication path is actually constructed or changed on the basis of the content of the determination and, when an instructing operation using a radio instruction/operation panel is performed in that state, the result of determining whether or not the construction state of the multiplexed communication path is appropriate is "APPROPRIATE" (such as when e.g., the radio communication success rate improves to a value of not less than a predetermined threshold value or when the time delay of communication data between the radio instruction/operation panel and the control device of the communication partner is within a predetermined allowable value range). On the other hand, the reward R determined by the reward calculation unit 112 can be regarded as the negative reward R in a case where, e.g., after the construction state of the multiplexed communication path is determined, the multiplexed communication path is actually constructed or changed on the basis of the content of the determination and, when an instructing operation using a radio instruction/operation panel is performed in that state, the result of determining whether or not the construction state of the multiplexed communication path is appropriate is "NOT APPROPRIATE" (such as when, e.g., the radio communication success rate decreases to a value of not more than the predetermined threshold value or when the time delay of communication data between the radio instruction/operation panel and the control device of the communication partner exceeds a predetermined threshold value). The absolute values of the positive and negative rewards R may be the same as or different from each other. As a determination condition, it may also be possible to make the determination by combining a plurality of values included in the determination data D.

The result of determining whether or not the construction state of the multiplexed communication path is appropriate can be shown not only in the "APPROPRIATE" and "NOT APPROPRIATE" two-scale representations, but also in multiple-scale representations. By way of example, it is possible to use a configuration in which, in the case where the maximum allowable value of time delay of communication data is $DR_{max}$, a reward R=5 is given when the value DR of time delay of communication data between the radio instruction/operation panel and the control device of the communication partner satisfies $0 \leq DR < DR_{max}/5$, a reward R=2 is given when the value DR satisfies $DR_{max}/5 \leq DR < DR_{max}/2$, and a reward R=1 is given when the value DR satisfies $DR_{max}/2 \leq DR \leq DR_{max}$. It is also possible to use a configuration in which the value $DR_{max}$ is set relatively large in the early stage of learning and is reduced as learning proceeds.

The value function updating unit 114 is allowed to have an action value table in which the state variables S, the determination data D, and the reward R are orderly shown in relation to an action value (e.g., numerical value) given by the function Q. In this case, the action of updating the function Q taken by the value function updating unit 114 is synonymous to the action of updating the action value table taken by the value function updating unit 114. At the time when the Q-learning is started, the correlation between the current state of the environment and the construction state of the multiplexed communication path is unknown. Accordingly, in the action value table, the various state variables S, the various determination data D, and the various rewards R are prepared in the form associated with randomly determined action values (function Q). Note that, upon recognizing the determination data D, the reward calculation unit 112 can immediately calculate the reward R corresponding thereto. The calculated value R is written in the action value table.

When the Q-learning is pursued using the reward R in accordance with the determination of whether or not the construction state of the multiplexed communication path is appropriate, the learning is led in a direction in which an action which allows the higher reward R to be obtained is chosen. In accordance with the state of the environment (i.e., the state variables S and the determination data D) which changes as a result of taking the chosen action in the current state, the action value (function Q) of the action taken in the current state is rewritten so that the action value table is updated. By repeating the update, the action value (function Q) shown in the action value table is rewritten such that a more appropriate action has a larger value. Thus, the unknown correlation between the current state of the environment (the current state of multiplexed radio communication among the devices to be managed) and the action (construction or changing of the multiplexed communication path) relative thereto is gradually clarified. That is, the update of the action value table allows the relationship between the current state of multiplexed radio communication among devices to be managed and the construction state of the multiplexed communication path to gradually approach the optimal solution.

Figure 4:
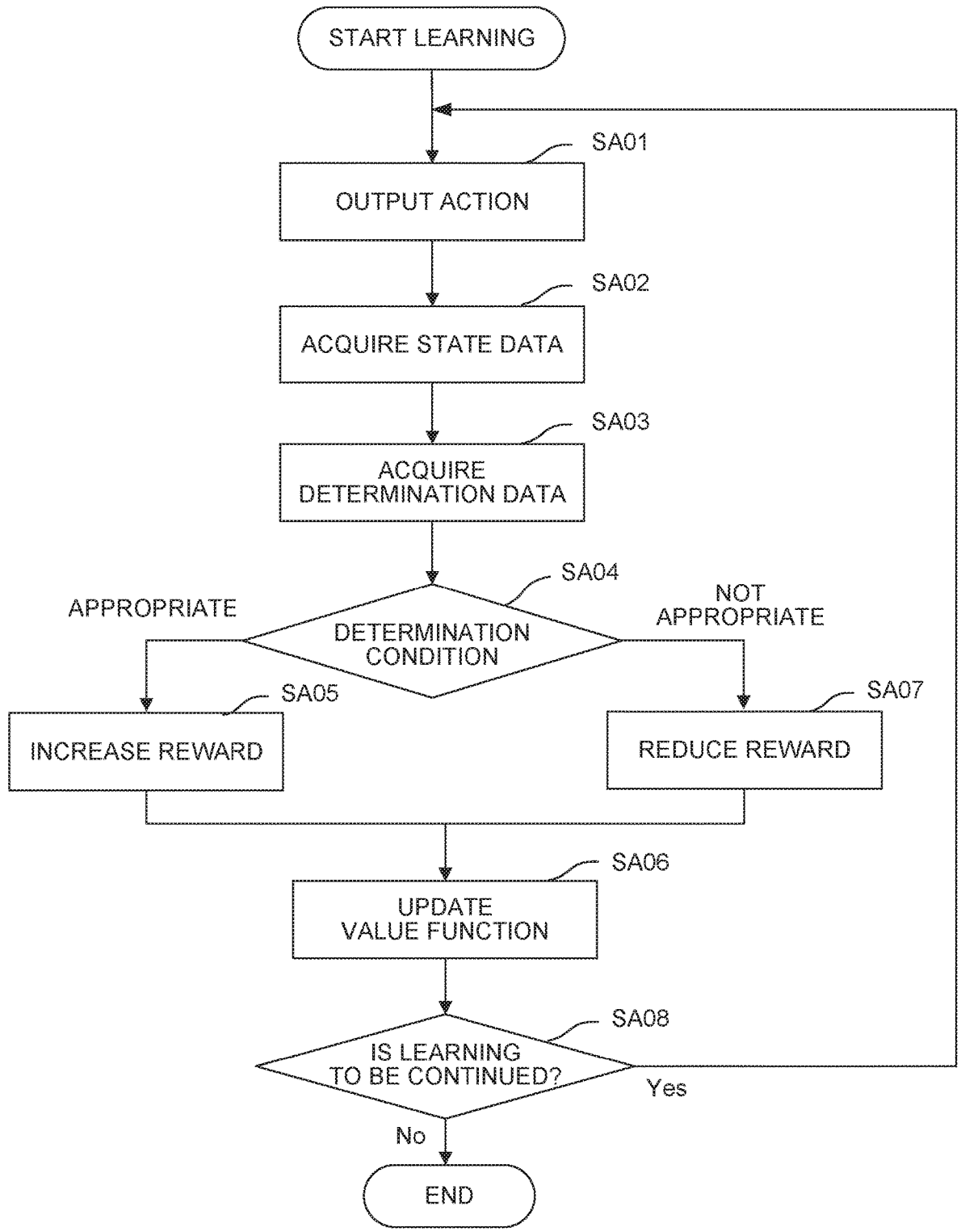
FIG. 4 is a schematic flow chart showing a form of a machine learning method.

Referring to FIG. 4, the flow of the above-described Q-learning executed by the learning unit 110 (i.e., a form of the machine learning method) will be further described. First, in Step SA01, the value function updating unit 114 refers to the action value table at that time and randomly chooses the construction state of the multiplexed communication path (construction or changing of the multiplexed communication path) as an action to be taken in the current state which is shown by the state variables S monitored by the state monitoring unit 106. Next, in Step SA02, the value function updating unit 114 retrieves the state variables S in the current state which are being monitored by the state monitoring unit 106. In Step SA03, the value function updating unit 114 retrieves the determination data D in the current state, which is acquired by the determination data acquisition unit 108. Next, in Step SA04, the value function updating unit 114 determines whether or not the construction state of the multiplexed communication path is appropriate on the basis of the determination data D. When the construction state of the multiplexed communication path is appropriate, in Step SA05, the value function updating unit 114 applies the positive reward R determined by the reward calculation unit 112 to the update expression for the function Q. Next, in Step SA06, the value function updating unit 114 updates the action value table using the state variables S, the determination data D, the reward R, and the action value (post-update function Q) in the current state. On determining that the construction state of the multiplexed communication path is not appropriate in Step SA04, the value function updating unit 114 applies the negative reward R determined by the reward calculation unit 112 to the update expression for the function Q. Next, in Step SA06, the value function updating unit 114 updates the action value table using the state variables S, the determination data D, the reward R, and the action value (post-update function Q) in the current state. The learning unit 110 repeats Steps SA01 to SA07 to repetitively update the action value table and pursue the learning of the construction state of the multiplexed communication path. Note that the process of determining the reward R and the process of updating the value function in Steps SA04 to SA07 are performed for each of the data items included in the determination data D.

Figure 5A:
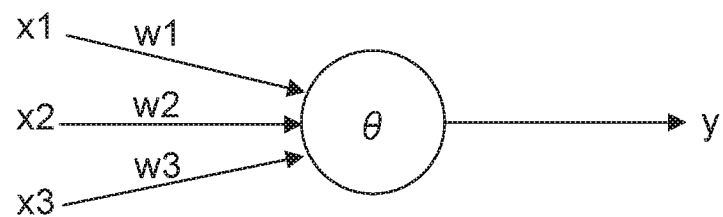
FIG. 5A is a view illustrating a neuron.
Figure 5B:
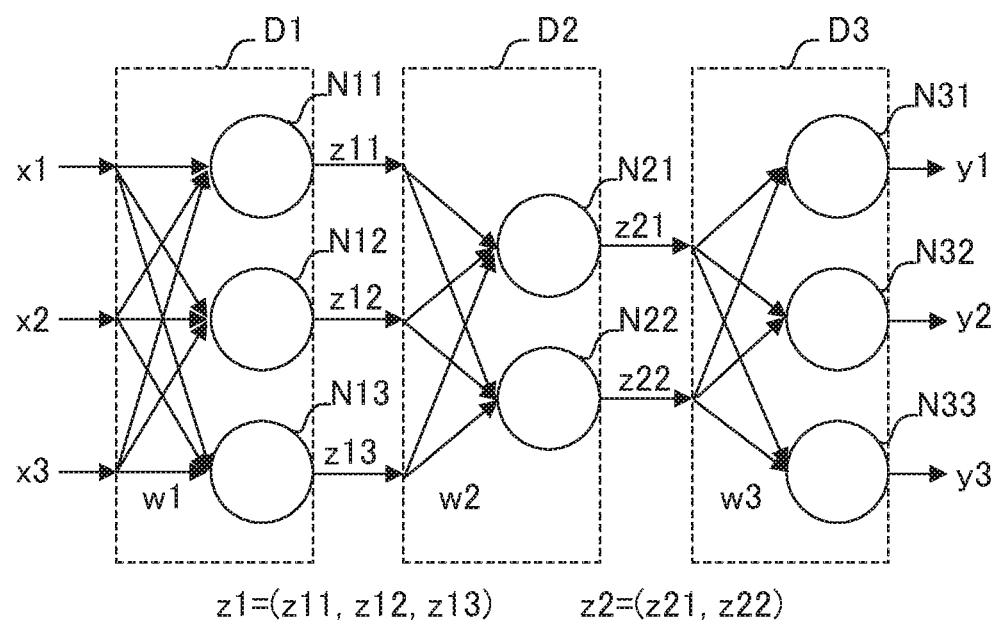
FIG. 5B is a view illustrating a neural network.

When the reinforcement learning described above is pursued, e.g., a neural network can be used instead of the Q-learning. FIG. 5A schematically shows a model of a neuron. FIG. 5B schematically shows a model of a three-layered neural network configured by combining the neurons shown in FIG. 5A. The neural network can be configured to include, e.g., an arithmetic device, a storage device, and the like which are designed to mimic the model of the neuron.

The neuron shown in FIG. 5A outputs a result y responding to a plurality of inputs x (which are inputs $x_1$ to $x_3$ herein, by way of example). The inputs $x_1$ to $x_3$ are multiplied by respective weights w ($w_1$ to $w_3$) corresponding to the inputs x. Thus, the neuron produces the output y given by Expression 2 shown below. Note that, in Expression 2, each of the inputs x, the output y, and the weights w is a vector, θ is a bias, and $f_k$ is an activation function.

$$y=f_k(\Sigma_{i=1}^{n}x_iw_i-\theta) \qquad \text{Expression 2}$$

To the three-layered neural network shown in FIG. 5B, the plurality of inputs x (which are the inputs x1 to x3 herein, by way of example) are input from the left side. The three-layered neural network shown in FIG. 5B outputs the result y (which are results y1 to y3 herein, by way of example) from the right side. In the example shown in the drawing, the inputs x1, x2, and x3 are multiplied by the corresponding weights (generally denoted by w1), and each of the inputs x1, x2, and x3 is input to three neurons N11, N12, and N13.

In FIG. 5B, the respective outputs of the neurons N11 to N13 are generally denoted by z1, which can be regarded as a feature vector obtained by extracting the feature amount of an input vector. In the example shown in the drawing, the feature vectors z1 are multiplied by the corresponding weights (generally denoted by w2), and each of the feature vectors z1 is input to two neurons N21 and N22. Each of the feature vectors z1 represents a feature between the weights w1 and w2.

In FIG. 5B, the respective outputs of the neurons N21 and N22 are generally denoted by z2, which can be regarded as a feature vector obtained by extracting the feature amount of the feature vector z1. In the example shown in the drawing, the feature vectors z2 are multiplied by the corresponding weights (generally denoted by w3), and each of the feature vectors z2 is input to three neurons N31, N32, and N33. Each of the feature vectors z2 represents a feature between the weights w2 and w3. Finally, the neurons N31 to N33 output the respective results y1 to y3.

Note that it is also possible to use a so-called deep learning method using a neural network including three or more layers.

In the machine learning device 100 included in the radio repeater selection apparatus 1, the learning unit 110 can output the construction state of the multiplexed communication path (results y) by performing an arithmetic operation in a multi-layer structure according to the neural network described above using the state variables S and the determination data D as the inputs x. In the machine learning device 100 included in the radio repeater selection apparatus 1, the learning unit 110 can also output the value of the action in the state (results y) by performing an arithmetic operation in a multi-layer structure according to the neural network described above using the neural network as the value function in the reinforcement learning and using the state variables S and the action a as the inputs x. Note that operation modes of a neural network include a learning mode and a value prediction mode. For example, it is possible to learn a weight w using a learning data set in the learning mode and determine the value of the action using the learned weight w in the value prediction mode. Note that, in the value prediction mode, it is also possible to perform detection, classification, inference, and the like.

The configuration of the radio repeater selection apparatus 1 described above can be described as the machine learning method (or software) implemented by the processor 101. The machine learning method is intended to learn the construction state of the multiplexed communication path and includes the step of causing the CPU of a computer to monitor the multiplexed communication path data S1 and the multiplexed radio communication state data S2 as the state variables S representing the current state of the environment in which multiplexed radio communication is performed, the step of causing the CPU of the computer to acquire the determination data D showing the result of determining whether or not the determined construction state of the multiplexed communication path is appropriate, and the step of causing the CPU of the computer to learn, using the state variables S and the determination data D, the multiplexed radio communication state data S2 and the construction state of the multiplexed communication path, which are associated with each other.

Figure 6:
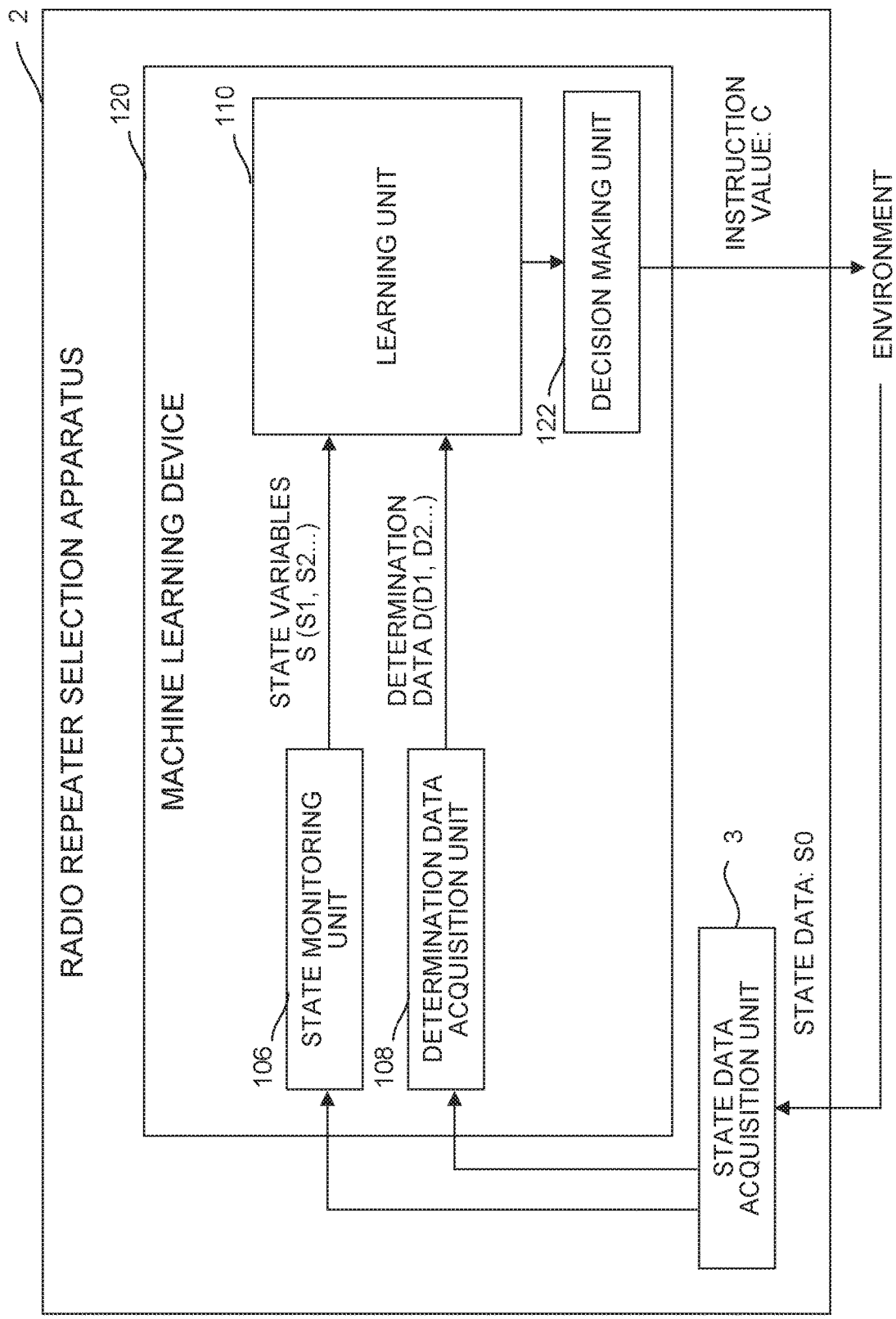
FIG. 6 is a schematic functional block diagram of a radio repeater selection apparatus according to the second embodiment.
Figure 7:
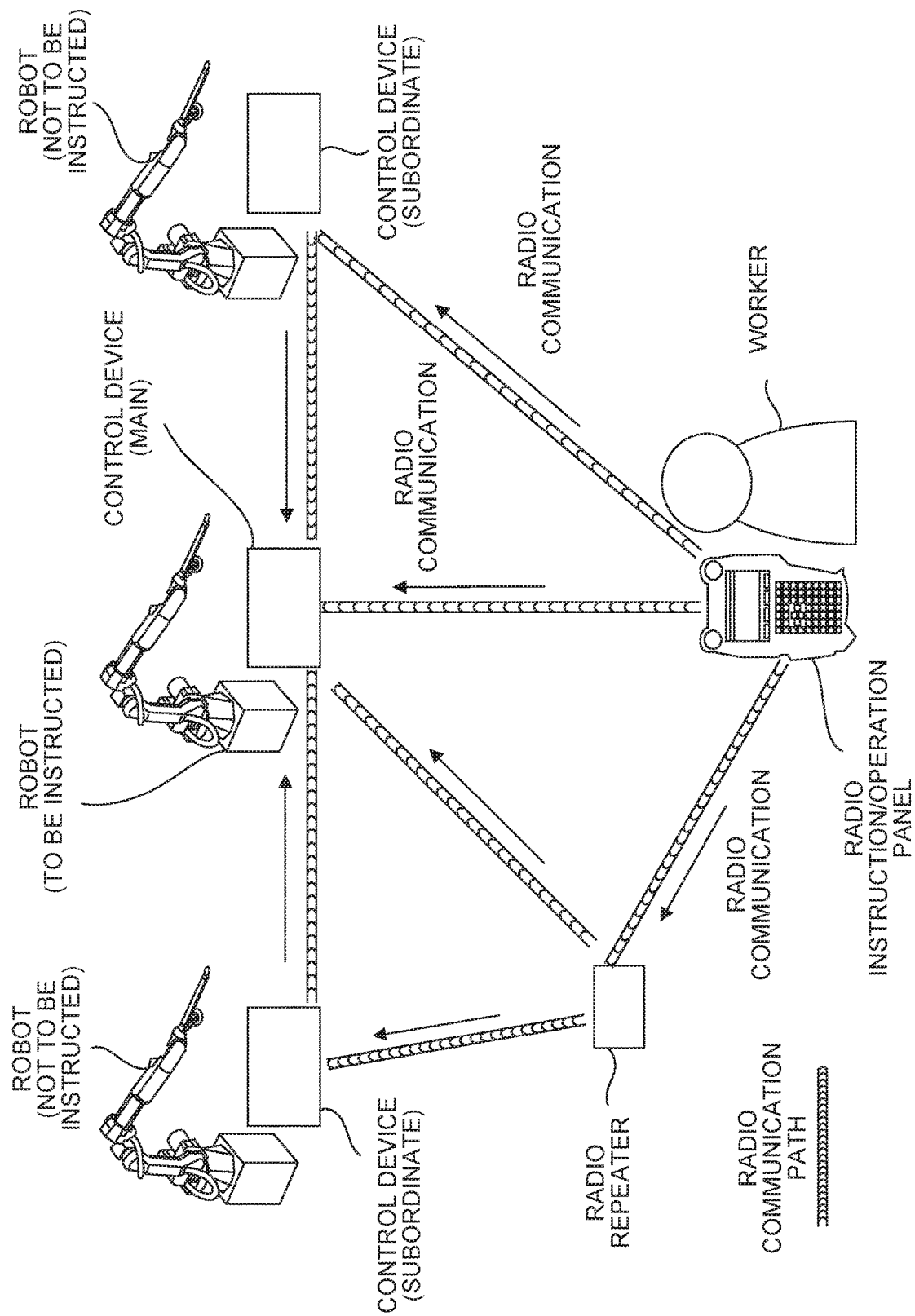
FIG. 7 is a view showing an example of a system which performs multiplexed communication.

FIG. 6 shows a radio repeater selection apparatus 2 according to the second embodiment. The radio repeater selection apparatus 2 includes a machine learning device 120 and a state data acquisition unit 3 which acquires the multiplexed communication path data S1 and the multiplexed radio communication state data S2, which are among the state variables S monitored by the state monitoring unit 106, as state data S0. The state data acquisition unit 3 can acquire the state data S0 from the data items stored in the memory of the radio repeater selection apparatus 2, the data acquired from each of the devices to be managed via the wired communication interface 15, the radio communication interface 16, or the like, the data appropriately input by a worker, and the like.

The machine learning device 120 of the radio repeater selection apparatus 2 includes not only software (such as a learning algorithm) and hardware (such as the processor 101) which allow the machine learning device 120 to learn the construction state of a multiplexed communication path, but also software (such as a learning algorithm) and hardware (such as the processor 101) which allow the machine learning device 120 to output the construction state of the multiplexed communication path determined on the basis of a learning result as an instruction to the radio repeater selection apparatus 2. The machine learning device 120 included in the radio repeater selection apparatus 2 may also have a configuration in which a single shared processor implements all software items including a learning algorithm, an arithmetic algorithm, and the like.

A decision making unit 122 can be configured as, e.g., a function of the processor 101. Alternatively, the decision making unit 122 can be configured as, e.g., software stored in the ROM 102 to cause the processor 101 to function. The decision making unit 122 generates an instruction value C including an instruction to determine the construction or changing of the multiplexed radio communication path relative to the current state of multiplexed radio communication among devices to be managed on the basis of the result of the learning by the learning unit 110 and outputs the generated instruction value C. The instruction value C may specify radio repeaters (radio repeaters and the radio communication modules included in control devices or the like which are used as radio repeaters) for radio communication paths used as the multiplexed communication path by each of the radio instruction/operation panels. The instruction value C may also show the difference between the multiplexed communication path currently constructed and a multiplexed communication path to be newly constructed. When the decision making unit 122 outputs the instruction value C to the radio repeater selection apparatus 2, the radio repeater selection apparatus 2 notifies each of the devices to be managed of the radio repeater to be used for multiplexed radio communication on the basis of the instruction. As necessary, the radio repeater selection apparatus 2 notifies the radio repeater (and the control device used as the radio repeater or the like) to permit connection from the device to be managed which uses the radio repeater and inhibit connection from a device other than the device to be managed which uses the radio repeater. As a result, the state of the environment changes.

The state monitoring unit 106 monitors the state variables S that has changed after the outputting of the instruction value C from the decision making unit 122 to the environment in the subsequent learning cycle. The learning unit 110 learns the construction state of the multiplexed communication path by, e.g., updating the value function Q (i.e., the action value table) using the changed state variables S. Note that, at that time, the state monitoring unit 106 may also monitor the multiplexed communication path data S1 from the RAM 103 of the machine learning device 120 as described in the first embodiment, instead of acquiring the multiplexed communication path data S1 from the state data S0 acquired by the state data acquisition unit 3.

The decision making unit 122 outputs the instruction value C which specifies the construction state of the multiplexed communication path (construction or changing of the multiplexed communication path) determined on the basis of the learning result to the radio repeater selection apparatus 2. By repeating the learning cycle, the machine learning device 120 pursues the learning of the construction state of the multiplexed communication path and gradually improves the reliability of the construction state of the multiplexed communication path determined by the machine learning device 120.

The machine learning device 120 included in the radio repeater selection apparatus 2 having the configuration described above achieves the same effects as achieved by the machine learning device 100 described above. In particular, the machine learning device 120 can change the state of the environment using the output from the decision making unit 122. On the other hand, the machine learning device 100 can cause an external device to perform a function equivalent to the decision making unit, which is for causing the learning result from the learning unit 110 to be reflected in the environment.

While the embodiments of the present invention have been described heretofore, the present invention is not limited only to the examples in the embodiments described above. The present invention can be implemented in various forms by making appropriate modifications thereto.

For example, the learning algorithms executed by the machine learning devices 100 and 120, the arithmetic algorithm executed by the machine learning device 120, the control algorithms executed by the radio repeater selection apparatuses 1 and 2, and the like are not limited to those described above, and various algorithms can be used.

Also, in the description given among embodiments described above, the radio repeater selection apparatus 1 (or 2) and the machine learning device 100 (or 120) have the different CPUs. However, the machine learning device 100 (or 120) may also be implemented by the CPU 11 included in the radio repeater selection apparatus 1 (or 2) and the system program stored in the ROM 12.

Also, each of the embodiments described above shows the example in which the machine learning device 100 (or 120) is embedded in the radio repeater selection apparatus 1 (or 2). However, the machine learning device 120 (or 100) can have a configuration in which the machine learning device 120 (or 100) is present in a cloud server capable of communicating with the radio repeater selection apparatus 1 (or 2) via a wired or radio communication network or the like.

While the embodiments of the present invention have been described heretofore, the present invention is not limited to the examples in the embodiments described above. The present invention can be implemented in another form by making an appropriate modification thereto.

The invention claimed is:

1. A radio repeater selection apparatus for constructing multiplexed communication paths used for communication between devices to be managed or changing among them, the radio repeater selection apparatus comprising:
   at least one processor configured to learn how the multiplexed communication paths are allocated, wherein the at least one processor is configured to:
      monitor, as state variables,
         multiplexed communication path data specifying the construction state of the multiplexed communication paths and including an allocation of radio communication paths used for said multiplexed radio communication, and
         multiplexed radio communication state data specifying a state of multiplexed radio communication among devices to be managed and including a radio communication success rate of the radio communication acquired from each device to be managed,
      acquire determination data designating a result of determination on whether or not the construction state of the multiplexed communication paths is appropriate and including a result of determination on whether or not the multiplexed radio communication data is appropriate when the multiple radio communication paths are constructed or changed on the basis of the acquired multiplexed communication path data, and
      learn whether or not the construction or changing of said multiplexed communication paths relative to the current state of multiplexed radio communication among devices to be managed is appropriate on the basis of the state variables and the determination data.

2. The radio repeater selection apparatus according to claim 1, wherein
   the state variables include location information data designating a location of each of the devices to be managed, and
   the at least one processor is further configured to learn the construction state of the multiplexed communication paths, the multiplexed radio communication state data, and the location information data in association with one another.

3. The radio repeater selection apparatus according to claim 1, wherein the determination data includes in addition to the result of determination on whether or not the construction state of the multiplexed communication path is appropriate, a result of determination on whether or not time delay of communication data between the devices to be managed is appropriate.

4. The radio repeater selection apparatus according to claim 1, wherein
   the at least one processor is further configured to:
      determine a reward related to the result of determinations, and
      update, using the reward, a function representing a value of the construction state of the multiplexed communication paths relative to the state of multiplexed radio communication among devices to be managed.

5. The radio repeater selection apparatus according to claim 1, wherein the at least one processor is further configured to perform an arithmetic operation on the basis of the state variables and the determination data in a multi-layer structure.

6. The radio repeater selection apparatus according to claim 1, wherein the at least one processor is further configured to output, on the basis of a learning result, an instruction value defined by the construction state of the multiplexed communication paths.

7. The radio repeater selection apparatus according to claim 1, wherein the at least one processor is present in a cloud server.

8. A machine learning device for learning a construction state of multiplexed communication paths used for communication between devices to be managed, the machine learning device comprising:
   at least one processor configured to:
      monitor, as state variables,
         multiplexed communication path data specifying the construction state of the multiplexed communication paths and including an allocation of radio communication paths used for said multiplexed radio communication, and
         multiplexed radio communication state data specifying a state of multiplexed radio communication among devices to be managed and including a radio communication success rate of the radio communication acquired from each device to be managed,
      acquire determination data designating a result of determination on whether or not the construction state of the multiplexed communication paths is appropriate and including a result of determination on whether or not the multiplexed radio communication data is appropriate when the multiple radio communication paths are constructed or changed on the basis of the acquired multiplexed communication path data, and learn whether or not the construction or changing of said multiplexed communication paths relative to the current state of multiplexed radio communication among devices to be managed is appropriate on the basis of the state variables and the determination data.

* * * * *